Patented Dec. 8, 1953

2,662,047

UNITED STATES PATENT OFFICE 2,662,047

PROCESS FOR THE PREPARATION OF THERAPEUTIC COMPOSITIONS FROM SPLEEN TISSUE

Jesus M. Amozurrutia, Mexico City, Mexico, assignor to Miranda Brothers Trading Corporation, New York, N. Y., a corporation of New York No Drawing. Original application November 27, 1945, Serial No. 631,230, now Patent No. 2,628,961, dated February 17, 1953. Divided and this application January 28, 1953, Serial No. 335,165

2 Claims. (Cl. 167—74)

This application is a division of the copending application, Serial No. 631,230, filed November 27, 1945.

This invention relates to therapeutic compositions, and more particularly to compositions capable of removing or diminishing the manifestations of the allergic state and adapted for the treatment of certain other ailments.

In 1902, Charles Richet found that one inoculation of a given protein tends to render an animal more sensitive instead of becoming immune to that protein. To this phenomenon of hypersensitiveness in experimental animals, he gave the name anaphylaxis. Von Pirquet in 1906 employed the term "allergy" to denote a similar kind of sensitivity in human beings. By following this line of thought, investigators came to the conclusion that there were some diseases in human beings which are characterized by an altered reactivity to external agents which result in, for example, hay fever, asthma, and eczema. The term "allergy" is now applied to this group of diseases.

There is still marked uncertainty among investigators with respect to the exact limits of allergy. This uncertainty arises from the observation that, in spite of all known factors concerning the mechanism of allergy, there are other components which are still unknown. In view of this situation, Doerr, in 1912 (Doerr, R., Allergic Phenomena, in Hand, d. Norm. u. Path., Physiol, 13: 650, 1929) chose allergy as a term to include all abnormal and specific reactions of the body to foreign, ordinarily innocuos, substances. Rackemann, Vaughan, Schick and Rowe, among others, recently reaffirmed such use of the term allergy. Since nearly every chronic or acute disease shows varying degrees of allergic reactions, Schick coined the term "hyperergy" to designate outstanding allergic manifestations, such as hay fever, asthma and eczema.

The diagnosis of a given disease as allergic and the identification of the causative antigen in the methods heretofore employed for the treatment of allergy precedes the management of the allergic patient. According to Rowe the routine laboratory studies should include: A complete blood count, urinalysis, a complement fixation or flocculation test, and roentgen-ray studies of the sinuses, chest, gastro-intestinal tract, including, if indications exist, the colon and gall bladder. In addition he suggests as aids in differential diagnosis, estimation of eosinophiles in the blood, nasal secretions, or oral secretions, gastric or vaginal mucous and gastric analysis, preferably of the functional type, with the alcohol meal or histamine injection in all gastro-intestinal disorders to cover the occassional occurrence of achylia or hypoclarhydria. Other tests are suggested, all of which involve considerable time to diagnose properly the allergic conditions and indicate a proper course of treatment. Unfortunately, these clinical tests are by no means without danger. Moreover, skin tests are not always reliable and are not uniformly accurate in the hands of different workers.

The treatment of an allergic condition is as a rule a painstaking and prolonged procedure. According to Urbach, there are five methods of combating allergic diseases. The five methods of treatment are:

1. Prophylaxis
2. Specific hyposensitization
3. Heterospecific hyposensitization
4. Deallergization
5. Symptomatic therapy As Urbach pointed out, the clinician must admit that the allergic viewpoint in general and the allergic approach to treatment in particular still encounter rather considerable skepticism among the profession, and that, in fact, the available methods of prophylaxis and therapy of allergic diseases, are to a certain extent inadequate.

According to the report of the U. S. Public Health Service in 1937, about 3,450,000 cases of hay fever and asthma alone existed in the United States. These figures do not include the millions of sufferers from mild cases of asthma and hay fever which were not reported. Vaughan stated that 10% of the population have definite allergic disturbances in need of treatment. According to Rowe, when the occurrence of all obvious manifestations of nasal-bronchial, cutaneous, gastro-intestinal, ocular, genito-urinary allergy and allergic migraine is accurately recognized, however, the incident of active allergic manifestations of either a major or minor degree probably lies between 30 and 50%. The occurrence of allergy would immediately be raised close to 100% if disturbances, mild or severe, arising from bacterial allergy, which is so important in some infections, were included. It is obvious, therefore, that therapeutic procedures are inadequate for the treatment of allergic conditions. Farmer is of the opinion that there is a factor which is common to all allergic conditions. He also believes that a single treatment might be found for the treatment of all of these conditions, but heretofore no successful single treatment has been proposed.

In accordance with this invention, the symptoms of the allergic state may disappear or diminish substantially by the administration of the new and novel therapeutic compositions of this invention. These compositions comprise haptenes or poly heterophilic substances which play the role of polyvalent antigens. They are derived from various organs and body tissues of mammals and are substantially insoluble in benzol, toluene, acetone, and cold ethyl alcohol (e. g. 16–20° C.) and are soluble in water and hot ethyl alcohol. They are glycosides and when treated with weak acids, they partially hydrolyze. When administered into mammals they produce, at the site of injection, local eosinophilic reactions. These substances when administered are free from fats and proteins.

The compositions of this invention are prepared from substantially all organs and tissues, such as the spleen and muscle of mammals, by means of various solvents, in which the compositions are soluble and the other constituents of the tissue, such as fats and lipoids, are insoluble, or alternately by means of solvents in which the compositions are insoluble and the other constituents of the tissue are soluble. For example, the spleen of a mammal, such as that of a hog, which contains these compositions is first extracted with benzol in which the fats of the spleen are substantially soluble. The resulting residue is then treated with a solvent, such as water, in which the compositions are soluble, and the resulting water solution is purified by any suitable means to remove the proteins therefrom. Alternately, the resulting residue is treated with a solvent, such as ethyl ether, and the mixture filtered, the residue being discarded. The compositions of this invention may be obtained from the filtrate by first evaporating it and dissolving the resulting residue in water, at a temperature of about 16 to 20° C. In either procedure, an aqueous solution of the resulting composition is placed in suitable containers, such as ampules, and sterilized by any convenient means, such as heating to a temperature of about 120° C. for a period of 20 minutes to one hour.

The compositions of this invention are glycosides and give the characteristic reaction for glycosides. When .001 milligram of the compositions of this invention are injected into mammals, such injections produce a local eosinophilic reaction which is readily discernible by a microscopic examination of a smear taken from the site of injection after a period of from 3 to 5 hours. Desirably, the therapeutic compositions of this invention are administered in a water solution intramuscularly. In certain cases of gastro-intestinal allergies, the therapeutic compositions may be administered orally. The compositions are haptenes, have poly heterophilic antigenic properties when introduced into the body of mammals, and have been found to diminish or substantially reduce the symptoms of the allergic state.

The therapeutic compositions of this invention are capable of eliciting antigenic reaction of a heterophilic and polyvalent nature and are nontoxic in therapeutic doses. A dosage of the therapeutic compositions which has been found satisfactory is .001 milligram. Conveniently, this dosage is administered by dissolving the therapeutic composition in an aqueous solution so that 1 cc. contains .001 milligram. The therapeutic compositions are administered for a period of about 6 days, after which there is no further treatment for a period of from one to several weeks. The therapeutic compositions are desirably not again administered until allergic symptoms are again manifested by the patient.

A more comprehensive understanding of this invention is obtained by reference to the following examples. The proportions and various solvents employed in these examples are merely illustrative and are not to be construed as limitations on the process of preparing the compositions of this invention.

*Example 1*

Ten kilograms of fresh hog spleen are ground in any suitable mechanism, such as a meat grinder, and then dried in the air, preferably employing air by means of circulating fans for evaporating the water therefrom. Subsequently the dried product is ground by any suitable means, such as a grain mill, to a finely divided state. To the resulting powder is added about 5 kilograms of pure benzol. The mixture is agitated vigorously and permitted to stand for a period of about 24 hours. The mixture is then filtered, and to the residue is added 5 kilograms of benzol. This benzol mixture is agitated vigorously for a few minutes, permitted to stand for a period of 24 hours and filtered. The residue is then spread out into a very thin layer and dried, desirably on filter paper or glass. The residue is then extracted with absolute ethyl ether. About 2 kilograms of ether are employed for this purpose. The compositions of this invention are soluble in the ethyl ether, while the proteins and other undesired materials are insoluble. The mixture is then filtered, and the residue discarded. The filtrate is evaporated, and to the resulting residue is added 1 liter of distilled water. The mixture is agitated with a glass rod or other agitating device that does not contaminate the resulting material. Extraction with water is conducted at a temperature between about 16 to 20° C. The mixture is then filtered and the residue discarded. The filtrate is placed in ampules or other suitable containers for administration. Desirably, the material after being placed in ampules is sterilized by the usual conventional methods, such as heating to about 120° C. in an autoclave for a period of 20 minutes to 1 hour. When a water solution containing .001 milligram of the composition prepared in accordance with this example is injected intramuscularly into mammals, and a smear of the tissue at the site of injection three to five hours after injection is microscopically examined an eosinophilic reaction is observed. Standard tests confirm that the composition prepared in accordance with Example 1 is a glycoside and that the final water solution of that composition is substantially free of fats and proteins.

*Example 2*

Ten kilograms of fresh hog spleen are ground and extracted with benzol as in Example 1 to separate the fat constituents from the compositions of this invention. To the residue obtained from this step is added about 500 cc. of distilled water. The mixture is agitated, permitted to stand for about 3 hours and then filtered. To the filtrate is added a sufficient quantity of cold absolute ethyl acohol (about 16 to 20° C.) to precipitate the material and the mixture is filtered. About 2 to 3 liters of absolute ethyl alcohol are required for this purpose. To the residue is again added about 250 cc. of water. The mixture is agitated, permitted to stand for about 3 hours and filtered. To the filtrate is added about 1 to 1½ liters of cold absolute ethyl alcohol to reprecipitate the composition of this invention. It is again filtered and the residue dissolved in about 250 cc. of water. Sufficient alcohol is then added to produce a mixture containing 80 to 85% alcohol and the mixture heated to the boiling point of the alcohol. The compositions of this invention are soluble in ethyl alcohol heated to this temperature. The mixture is filtered while the mixture is at the elevated temperature, and the filtrate permitted to cool to room temperature or lower. Desirably, the pH of the mixture is adjusted to between 5 and 7 to assure a good yield of the precipitate. Since the therapeutic compositions of this invention are substantially insoluble in cold ethyl alcohol, it precipitates out under these conditions. The mixture is then filtered. If the precipitate indicates a contamination by other than a pure white color, the procedure of purification by dissolving in water and precipitating with alcohol is repeated. The precipitate is purified by recrystallization with ether. When .001 milligram of the resulting therapeutic composition is injected into mammals, such as the guinea pig, a local eosinophilic reaction is observed by microscopic examination in smears taken from the mammal at the sight of the injection three or four hours after the injection. The resulting composition gives no reaction for proteins or fats and a position reaction for glycosides.

Although in the specific examples the therapeutic compositions of this invention are derived from the spleen of a mammal, such compositions may be obtained from other body tissues of the mammals, by following the procedure outlined in the examples. Whether derived from the spleen or other tissue of mammals, the compositions are substantially the same, and .001 milligram of such compositions produce a local eosinophilic reaction when injected into mammals.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. The method of preparing a therapeutic composition comprising separating the benzol soluble from the benzol insoluble portions of the spleen tissue of a mammal, dissolving the benzol insoluble portion in water, separating any undissolved water insoluble materials therefrom, adding sufficient cold ethyl alcohol to the water extract to produce a concentration of 80 to 85% ethyl alcohol, separating the precipitate formed, redissolving said precipitate in water, removing any water insoluble material, adding sufficient alcohol to produce a mixture containing 80 to 85% ethyl alcohol, heating said mixture to about the boiling point thereof, removing any insoluble materials in said mixture, adjusting the pH of said mixture between 5 and 7 and permitting it to cool, removing the resulting precipitate and recrystallizing said precipitate with ethyl ether.

2. The method of producing a therapeutic composition which comprises separating the benzol soluble from the benzol insoluble portions of the spleen tissue of a mammal, extracting with water the water soluble components of said benzol insoluble portion, separating any insoluble matter from the resulting extract, adding cold ethyl alcohol to the water extract to precipitate the therapeutic composition, forming a hot ethyl alcohol extract of the precipitate, separating the insoluble matter therefrom and recovering the components of the resulting extract which are insoluble in cold ethyl alcohol.

JESUS M. AMOZURRUTIA.

No references cited.